United States Patent
Wolff

(10) Patent No.: US 8,998,270 B2
(45) Date of Patent: Apr. 7, 2015

(54) THREADED ADAPTOR

(75) Inventor: Brian P. Wolff, Raytown, MO (US)

(73) Assignee: Husky Corporation, Pacific, MO (US)

( * ) Notice: Subject to any disclaimer, the term of this patent is extended or adjusted under 35 U.S.C. 154(b) by 746 days.

(21) Appl. No.: 13/199,259

(22) Filed: Aug. 24, 2011

(65) Prior Publication Data

US 2013/0049360 A1 Feb. 28, 2013

(51) Int. Cl.
*F16L 17/00* (2006.01)
*F16L 15/04* (2006.01)
*F16L 25/14* (2006.01)
*F16L 33/207* (2006.01)

(52) U.S. Cl.
CPC .............. *F16L 15/04* (2013.01); *F16L 25/14* (2013.01); *F16L 33/2071* (2013.01)

(58) Field of Classification Search
USPC ............ 285/347, 40, 36, 392, 397, 370, 351, 285/917
See application file for complete search history.

(56) References Cited

U.S. PATENT DOCUMENTS

| | | | |
|---|---|---|---|
| 2,449,635 A | 10/1946 | Barr | |
| 3,003,795 A * | 10/1961 | Lyon | 285/212 |
| 3,074,748 A * | 1/1963 | Ulrich | 285/347 |
| 3,376,053 A * | 4/1968 | Novakovich et al. | 285/92 |
| 4,342,738 A | 8/1982 | Burgund | |
| 4,547,356 A | 10/1985 | Papweau | |
| 4,572,551 A * | 2/1986 | Jaquette | 285/108 |
| 5,085,176 A | 2/1992 | Brinkley, III | |
| 7,070,208 B2 * | 7/2006 | Richey et al. | 285/220 |
| 7,721,681 B1 | 5/2010 | Russell, Sr. | |

FOREIGN PATENT DOCUMENTS

| | | |
|---|---|---|
| DE | 4140650 A1 | 6/1993 |
| GB | 1513744 A | 6/1978 |
| WO | WO81/00279 A1 | 2/1981 |
| WO | WO2008/000010 A2 | 1/2008 |

OTHER PUBLICATIONS

European Patent Office; Search Report; Reference 04230033EP; Application No. 10161513.6-1263; Based on U.S. Appl. No. 11/973,176, dated Oct. 6, 2007.

* cited by examiner

*Primary Examiner* — Aaron Dunwoody
(74) *Attorney, Agent, or Firm* — Paul M. Denk

(57) ABSTRACT

A threaded adaptor has a first end and an opposite second end of a generally hollow cylinder. At least one end has threading for connection to a hose or fitting and the ends form the male half of the connection. Centered upon the adaptor, a collar provides at least two faces for gripping of the adaptor by a tool. Within the adaptor, the two ends open into a smooth chamber that allows for uninterrupted fluid flow. To further seal the adaptor, at least one O-ring and at least one gasket are provided as alternate embodiments. In another alternate embodiment, the adaptor has one threaded end, an opposite barbed end with a clamp, and a collar with six faces. These two ends open into a chamber with a stepped diameter. The adaptor provides for flow of fluid with little turbulence.

6 Claims, 6 Drawing Sheets

THREADED ADAPTOR

BACKGROUND OF THE INVENTION

This threaded adaptor relates in general to means for connecting coaxial hoses, nozzles, and fittings, such as a gasoline line connecting to a nozzle used by motorists for fuel dispensing at a service station, and more specifically to improvements upon the adaptor for grasping by a tool, a straight flow path, and either an O-ring or gasket upon each end of the adaptor for sealing. A unique aspect of the present adaptor is its single piece body that provides for a cylindrical flow path through the interior of the adaptor.

Upon arriving at a pump of a service station, a motorist views a nozzle connected to a length of hose, and the hose connected to the pump. The lengths of hose, fittings, and nozzles require connection among themselves and to service station pumping facilities. Hoses extend from fixed and rigid piping extending from the pump, generally concealed from a motorist. The hoses may extend from the side of the pump, approximately midway on its height or from overhead of the pump, descending to the typical usage height of a motorist. Hoses, manufactured to specific lengths, generally extend continuously from the pump to the nozzle. However, hoses break from mishandling or the elements. Select hose materials allow for repairs so that a worker cuts off the broken portion and replaces it with an end fitting. A hose, having less than the length between the pump and the nozzle, calls for a splice with another hose. Fewer still hose materials allow for direct splicing of one hose to another in the absence of a fitting. Generally, one hose connects to another hose using a fitting.

Also, where a hose connects to a breakaway coupler or a breakaway coupler connects to the fuel line from the pump, an adaptor joins the two adjacent components for continuous flow there through.

DESCRIPTION OF THE PRIOR ART

Over the years, various couplings have sought to join hoses or hoses to fittings. The U.S. Pat. No. 2,541,200 provides a coupling that secures upon a hose end using wedge action. The coupling has a threaded body opposite the hose. The threaded body threadily engages a threaded collar and compresses a conical wedge that secures the coupling upon the end of a hose. The threaded collar has an exterior octagonal shape and a flush surface proximate the hose opposite the threaded body. This coupling though fits upon the end of a hose but does not allow for simultaneous connection of two hoses as in the present invention.

Along with couplings, various adaptors have sought to connect hoses to themselves or to fittings and nozzles. Petroclear, of Albion, Ill. manufactures an adaptor, also called a filter head. This adaptor appears cast as a single piece, generally elongated with a widened center portion. The adaptor has two opposite ends having an octagonal shape with a threaded female aperture along the axis of the adaptor. Generally centered upon the adaptor and beneath the widened center, a threaded male plug fits into a cooperating female aperture and extends outwardly from the adaptor. This adaptor allows for connection of two items in a coaxial manner using male threaded tips that engage the female apertures of the ends of this adaptor.

Another adaptor comes from CIM-TEK of Bement, Ill. The CIM-TEK adaptor has a generally elongated cylindrical form upon a centered conic base. The conic base has a stem extending outwardly for connection to auxiliary items such as a fuel filter. Above the base, this adaptor has a passageway for fuel flow from either end. The ends accept fittings as commonly known in the art.

The difficulty in providing a threaded adaptor is also shown by the existing adaptors. The existing adaptors generally connect to adjacent hoses or fittings through their female ends while a male plug or stem connects the adaptor to another object and prevents rotation of the adaptor during tightening of the hoses. The prior art adaptors provide limited opportunity to connect adjacent hoses in the absence of a rotation preventing object.

The present art overcomes the limitations of the prior art. Where, the present invention, a threaded adaptor, uses two male threaded stems for connection to adjacent hoses or a hose adjacent to a fitting or a nozzle. The adaptor also has its truncated collar that provides a gripping location for a wrench that fixes the adaptor against rotation during connection of hoses, fittings, or nozzles, thereto. The adaptor of the present invention allows for rapid connection of hoses using hand tools in a field environment.

SUMMARY OF THE INVENTION

A threaded adaptor begins with a first end and an opposite second end of a generally hollow cylinder. At least one of the ends includes threading for connection to a hose or other fitting and the ends form the male half of the connection. Centered upon the adaptor, a collar provides at least two faces for gripping of the adaptor by a wrench or other tool. Within the interior of the adaptor, the two ends open into a smooth walled chamber that allows for uninterrupted fluid flow. To further seal the connection of the adaptor to a hose or fitting, at least one O-ring and at least one gasket are provided as alternative embodiments. In a further alternate embodiment, the adaptor has one threaded end and an opposite barbed end with clamp centered upon a collar with six faces. These two ends open into a chamber with a step in diameter interior of the collar. The adaptor in all embodiments provides for flow of fluid through it with few if any turbulent effects.

Generally, the threaded ends simply turn into cooperating female threaded hoses and fittings. A user places a tool upon the collar thus gripping the adaptor for installation of a second hose or fitting at low labor and equipment cost. Strategically located O-rings provide for fluidic sealing of the adaptor to various hoses and fittings in the flow line from a fuel pump. The present invention does not require the use of any strong biasing springs, or other mechanisms, to provide for its quick and simple installation.

Therefore, it is an object of the invention to provide a new and improved threaded adaptor for fuel nozzles, fittings, hoses, and lines.

It is a further object of the present invention to connect two fluid transmitting items generally coaxially for minimal turbulent flow.

It is a further object of the present invention to provide an adaptor that allows for grasping by a tool upon its center.

It is a further object of the present invention to dissipate any abrupt pressure spikes generated within the adaptor during its functioning within a flow line thus preventing undesirable fuel leakage or untimely separation of hoses and fittings.

Another object of this invention is to provide an adaptor where its sealing O-rings and gaskets are normally located within seats and cooperating with threads respectively during normal and routine usage of the adaptor when installed within a fluid flow line.

Another object is to provide such an adaptor that is capable of connecting to a variety of hoses and fittings having female ends, threaded and unthreaded.

Another object is to provide such an adaptor that has a low cost of manufacturing so the purchasing people and organizations can readily buy the adaptor through stores and supply sources.

These and other objects may become more apparent to those skilled in the art upon review of the invention as described herein, and upon undertaking a study of the description of its preferred embodiment, when viewed in conjunction with the drawings.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
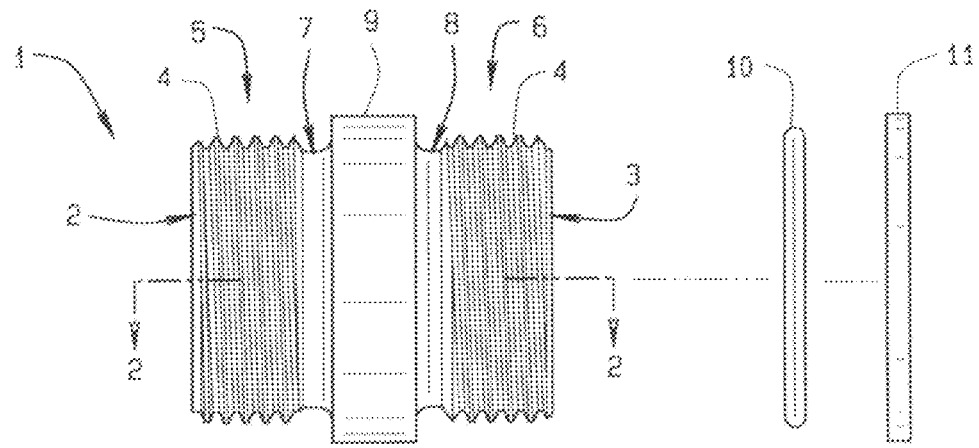
FIG. 1 shows a side view of the adaptor of the present invention.

The present art overcomes the prior art limitations by providing an adaptor that has a smooth interior, at least one threaded male end, and a centered collar. Turning to FIG. 1, an adaptor 1 has a generally hollow cylindrical form with a first end 2 and an opposite second end 3. As shown both ends 2, 3, have external threads 4, here shown as right hand, coarse. The threads continued for approximately five revolutions around the circumference of the ends. The threads extend inwardly upon a first stem 5 and an opposite second stem 6. The stems are hollow and have sufficient length for a solid connection of the adaptor to a hose or other fitting. Inwardly, each stem has a notch, a first notch 7 at the end of the threads 4 on the first stem 5, and a second notch 8 opposite the first notch where the threads 4 end on the second stem 6. The notches 7, 8 have a lesser diameter than the threads 4 and the ends 2, 3. Centered between the two stems and more precisely centered between the notches, the adaptor has a collar 9 of a diameter noticeably greater than diameter of the threads. The collar has a thickness, along the length of the adaptor, suitable for gripping by a tool, such as a wrench or channel lock pliers. The collar extends around the circumference of the adaptor, that is, perpendicular to the length of the adaptor. The collar is generally round but for at least two faces as later shown in FIG. 3. As an alternate embodiment, the adaptor includes at least one O-ring 10 and at least one gasket 11. The O-ring has a generally O shape as later shown in FIG. 4 and a rounded cross section. The gasket also has a generally rounded shape as shown later in FIG. 4 but with a squared cross section.

Figure 2:
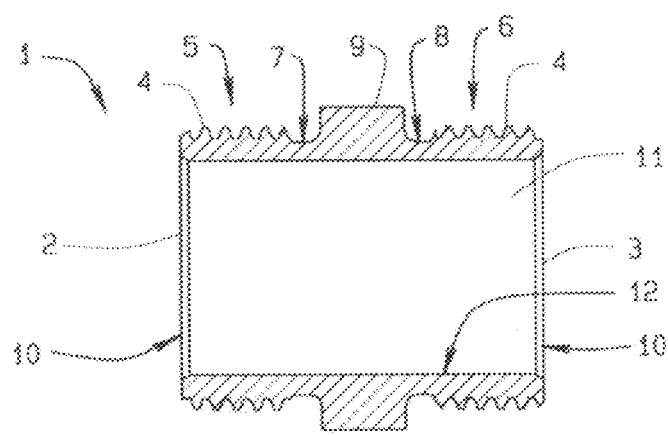
FIG. 2 shows a sectional view of the adaptor.

Within its interior, the adaptor provides for smooth flow of fluid, such as fuel, there through as shown in FIG. 2. The adaptor has its centered collar 9, notches 7, 8 outwardly of the collar, the opposed first stem 5 and second stem 6 where each has threads 4 as shown and described. The first stem has its generally hollow shape opening to the first end 2. The first end includes a slight inward bevel that extends around the circumference of the first end. The second stem continues the hollow shape of the first end through to its opening at the second end 3. The second end also has an inward bevel as at 10. In this view, the first end 2 admits fuel into the first stem that flows smoothly through the second stem 6 and out of the second end 3. The smooth fluid flow occurs through a chamber 12, generally hollow, that extends through both stems 5, 6 and through the collar 9. The chamber defines an interior surface 12 of the adaptor as shown. The interior surface forms the circumference of the chamber at a generally constant radius so that fuel flows through the adaptor with few if any turbulent effects induced by the surface into the flow.

Figure 3:
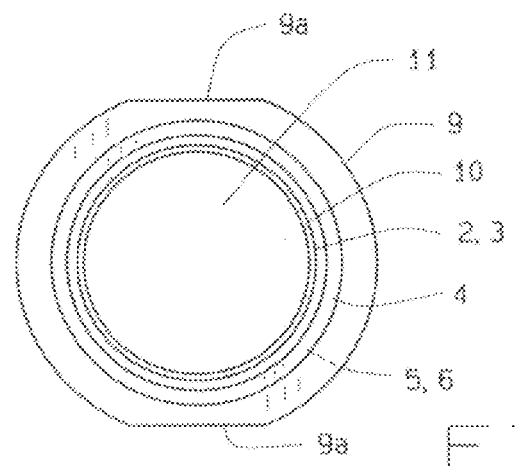
FIG. 3 shows an end view of the adaptor.

This embodiment of the adaptor, generally symmetric as shown in FIGS. 1, 2 has a generally round shape when viewed on end in FIG. 3. The adaptor has its collar 9 that generally defines the maximum diameter, that is, width of the adaptor as seen by the motorists after its installation. The collar, generally round, has two spaced apart and mutually parallel faces 9a. The faces allow for a tool, such as a wrench or channel lock pliers, to grip the adaptor. The tool then either turns the adaptor into a hose or fitting, or holds the adaptor steady as a hose or fitting turns upon either stem. Stepped inwardly from the collar's diameter, the adaptor has a stem 5, 6 which has threads 4 here shown on end. In the center foreground of the figure, the stem has an end 2, 3 here shown with an inward bevel. Interior of the end and beyond the bevel, the adaptor has the chamber 12 through which fuel flows.

Figure 4:
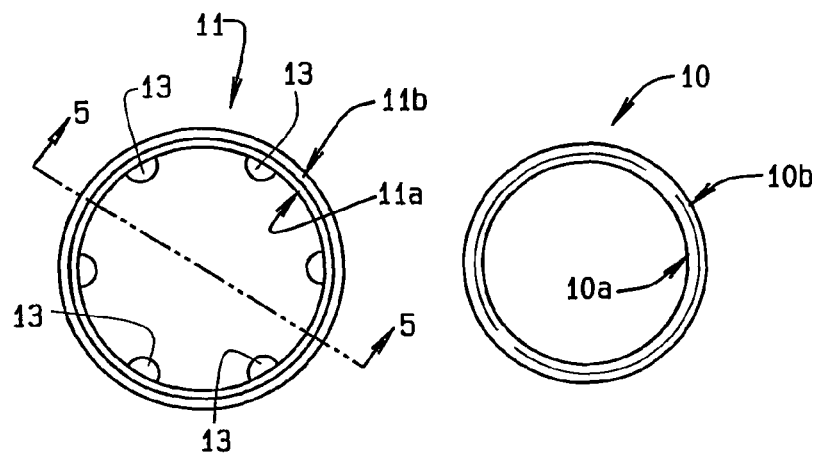
FIG. 4 describes a top view of the O-ring and gasket for the alternate embodiments of the present invention.

Generally for closing off the threaded connection of a hose or fitting to the adaptor proximate the notches 7, 8, the adaptor provides the gasket 11 and the O-ring 10 as shown in FIG. 4. The O-ring 10 is generally round within an inner edge 10a at an inner diameter and an outer edge 10b at an outer diameter greater than the inner diameter. The O-ring has a generally round cross section, radially, between the inner edge and the outer edge. The inner diameter is generally slightly more than the diameter of the adaptor at the notches but less than the diameter of the thread 4. The O-ring has a material that allows for slight stretching for placement over the threads and compression by a hose or other fitting when connected thereto. Alternatively, the adaptor has the gasket 11, generally round, with an inner rim 11a at an inner diameter and a rim 11b at the outer diameter of the gasket. The inner diameter of the gasket generally exceeds that of the O-ring. The inner rim and rim of the gasket form a generally square cross section as later shown in FIG. 5. Upon the inner rim, the gasket has a plurality of spaced flutes 13. Here the flutes have a generally semi-circular shape extending inwardly into the gasket, towards its nominal center. The radius of each flute begins at the inner rim and turns through 180 degrees of arc. Preferably, the gasket has an even number of flutes, here shown as six. The flutes engage the threads 4 of each stem 5, 6 and allow a user to rotate the gasket to a desired position upon the stem. If a gasket is used then no O-ring can be used and visa versa. Alternatively, the gasket has an odd number of flutes to preventing jamming of the gasket during turning upon the threads 4.

Figure 5:
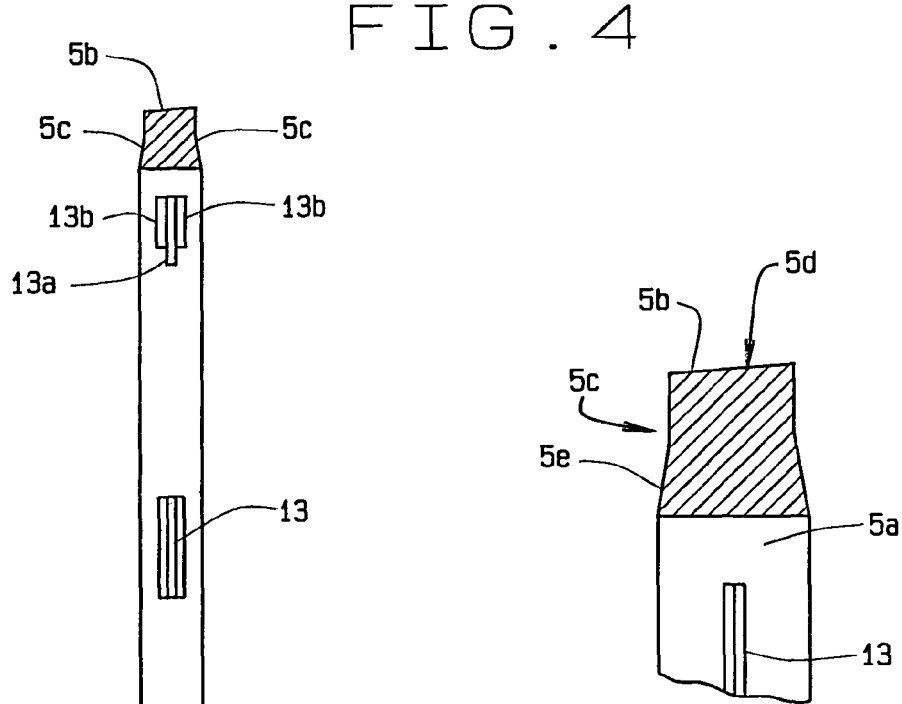
FIG. 5 shows a sectional view of the gasket.

FIG. 5 then shows a cross sectional view of the gasket 11. The gasket has the rim 11b that faces outwardly from the gasket and adaptor when installed, and the opposite inner rim 11a upon the interior of the gasket. Perpendicular to the rim and the inner rim, an edge 5c joins the two rims upon both sides of the gasket. The edges and the two rims generally form a square cross section as shown in the top and the bottom of the figure. Upon the inner rim, the gasket has the flutes 13, generally equally spaced. Each flute has a thin tip 13a away from the inner rim than merges with shoulders 13b of greater thickness than the tip. The shoulders join to the inner rim. The flutes and the tips extend inwardly, that is, away from the inner rim.

Figure 6:
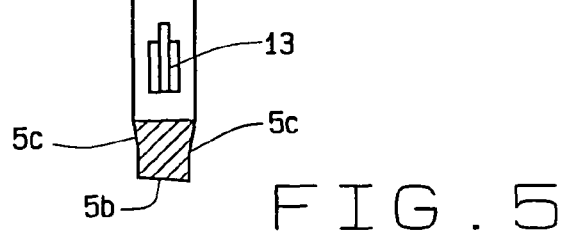
FIG. 6 shows a detailed view of the edge of the perimeter of the gasket.

FIG. 6 then shows the perimeter of the gasket more closely. Though showing a portion of the perimeter in this figure, the structure extends upon the entire perimeter of the gasket. The gasket has the inner rim 11a with a flute 13, rim 11b, and edge 5c as before. The rim though in this embodiment has a slight slope 5d, extending from left to right in the figure. The slope is approximately 1 to 4 degrees and oriented so that the bottom of the slope advances towards the collar upon turning the gasket on a stem. The edge 5c further includes a taper 5e partially along the length of the edge. The taper begins at the thickness of the gasket and then narrows slightly about midway along the edge.

Figure 6A:
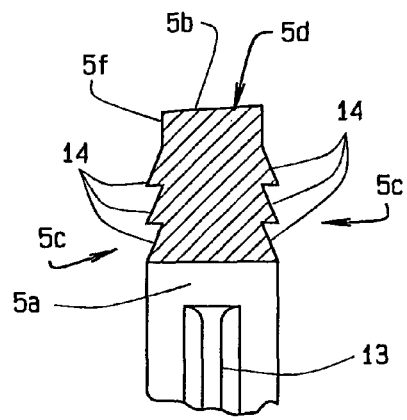
FIG. 6a provides a detailed view of an alternate embodiment of the edge of the perimeter of the gasket.
Figure 6B:
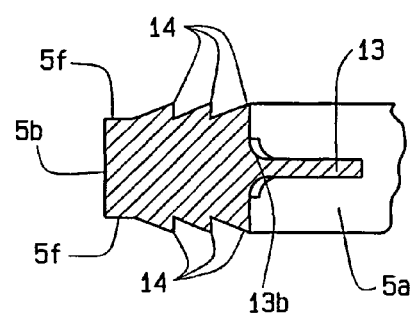
FIG. 6b provides a detailed view of an alternate embodiment of the edge of the perimeter of the gasket.

Another form of the edge 5c appears in FIG. 6a with a perimeter sectional view. The gasket begins with a flute 13 upon the inner rim 11a with the opposite, or outwardly, rim 11b as before. The rim has its slope 5d outwardly from the inner rim similar to that shown in FIG. 6. Unlike the smooth edges 5c, this embodiment has three mutually spaced apart barbs 14 here shown in section. The barbs appear as concentric rings upon the edges when see as in FIG. 4. The barbs, as a group, extend at least midway from the inner rim to the rim. The barbs have their narrowest portion outwardly towards the rim and their thicker portion inwardly towards the inner rim. Outwardly from the barbs 14, the gasket has a tip 5f generally proximate the rim. The tip generally lacks barbs or other securing surface features. FIG. 6b orients the sectional view to a flat orientation as a hose or fitting would abut the gasket. In FIG. 6b though, the rim 11b at the tip 5f is generally square, or without a slope. This figure also shows a partial section of a flute where the tip extends inwardly from the shoulders.

Figure 6C:
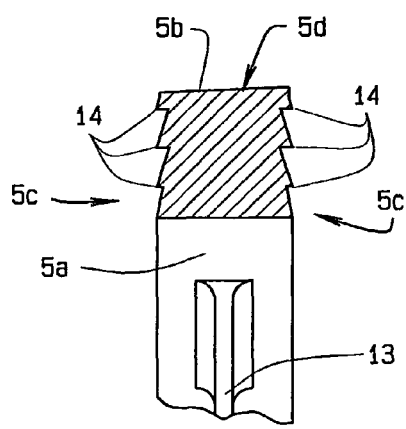
FIG. 6c provides a detailed view of an alternate embodiment of the edge of the perimeter of the gasket.
Figure 6D:
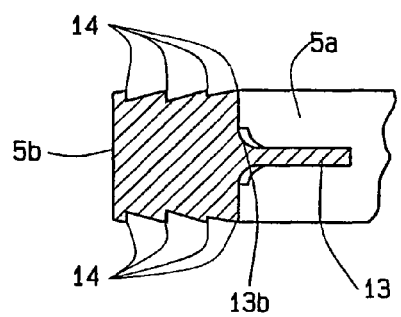
FIG. 6d provides a detailed view of an alternate embodiment of the edge of the perimeter of the gasket.

A third form of the edge 5c appears in FIG. 6c, also in a perimeter sectional view. The gasket has its flute extending inward from the inner rim 11a with the opposite, or outwardly, rim 11b as before. The rim has its slope 5d outwardly from the inner rim similar to that shown in FIG. 6. This embodiment also has three mutually spaced apart barbs 14 here shown in section. The barbs appear as concentric rings upon the edges when see as in FIG. 4. These barbs, as a group, span from the inner rim to the rim. The barbs have their narrowest portion outwardly towards the rim and their thicker portion inwardly towards the inner rim. In this embodiment, the gasket lacks a tip as in the previous embodiments of the edges. FIG. 6d orients the sectional view to a flat orientation as a hose or fitting would abut the gasket. Similar to FIG. 6b, the rim 11b is generally square, or without a slope. The rim also truncates the outer barb on the top and bottom edges. This figure also shows a partial section of a flute where the tip extends inwardly from the shoulders.

Figure 7:
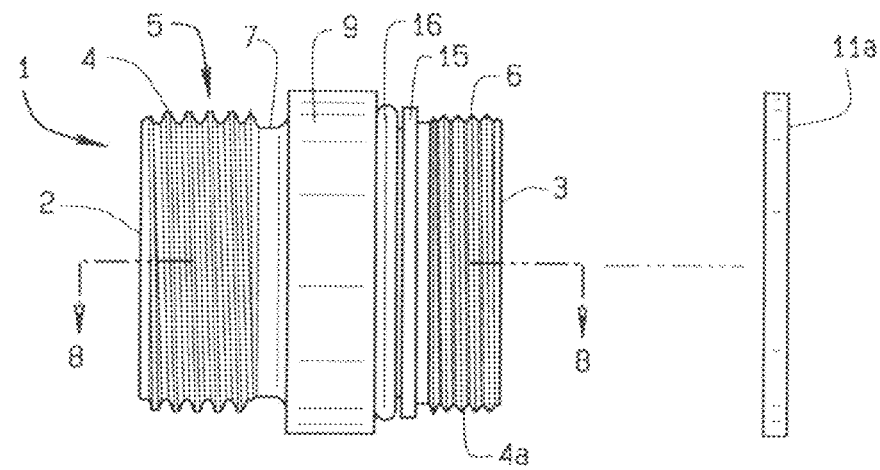
FIG. 7 shows a side view of an alternate embodiment of the adaptor of the present invention.

A second embodiment of the adaptor appears in FIG. 7 in a side view. This adaptor 1 also has a generally hollow cylindrical form with a first end 2 and an opposite second end 3. As shown both ends 2, 3, have external threads here shown as right hand. The threads continued for approximately five revolutions around the circumference of the ends. The threads extend inwardly upon a first stem 5 and an opposite second stem 6. The stems are hollow and have sufficient length for a solid connection of the adaptor to a hose or other fitting. The threads upon the first stem, as at 4, have generally coarse form while the threads upon the second stem, as at 4a, have generally fine form. Inwardly, each stem has a notch, a first notch 7 at the interior ending of the threads 4 on the first stem 5. The second stem 6 also has a flange 15 inwardly of the interior ending of the threads 4a and a second notch 8 inwardly of the flange opposite the first notch where the threads 4 end on the second stem 6. The notches 7, 8 have a lesser diameter than the threads 4, 4a and the ends 2, 3. The second notch 8 receives an O-ring 16 upon its circumference. The O-ring has a generally round shape with a round cross section. The O-ring has an outer diameter similar to the outer diameter of the flange. Centered between the two stems, this embodiment of the adaptor also has a collar 9 of a diameter noticeably greater than diameter of the threads. The collar has a thickness, along the length of the adaptor, suitable for gripping by a wrench or other tool. The collar extends around the circumference of the adaptor, perpendicular to the length of the adaptor. The collar is generally round except for two faces as later shown in FIG. 9. As an alternate embodiment, the adaptor includes at least one gasket 11 that has a generally rounded shape as previously shown in FIGS. 4, 5 with the variations shown in FIGS. 6-6d.

Figure 8:
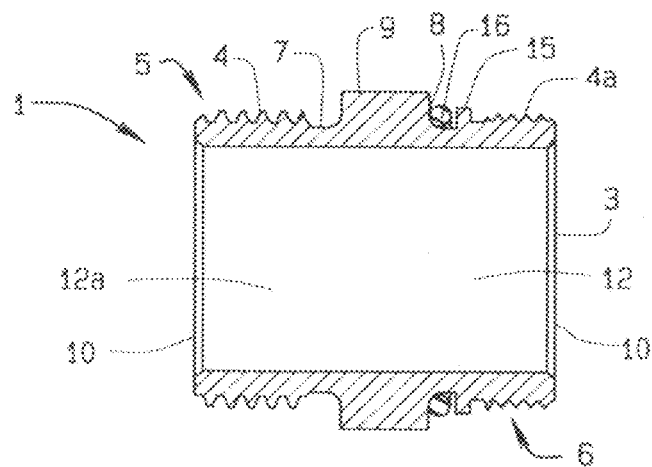
FIG. 8 shows a sectional view of the alternate embodiment of the adaptor.

Within its interior, the adaptor provides for smooth flow of fluid, mostly fuel, as shown in FIG. 8. This embodiment of the adaptor also has its centered collar 9, notches 7, 8 outwardly of the collar, the opposed first stem 5 and second stem 6 where each has threads 4, 4a as shown and described. The first stem has its generally hollow shape opening to the first end 2. The first end includes a slight inward bevel 10 that extends around the circumference of the first end. The second stem continues the hollow shape of the first end through to its opening at the second end 3. The second end also has an inward bevel as at 10. The second end opens into the second stem 6 that has the O-ring 16 upon the second notch 8. As shown in this view, the second notch 8 has a larger diameter than the first notch 7, that is, the second notch is shallower than the first notch. The diameter of the second notch and the outer diameter of the O-ring cooperate so that the O-ring remains within the diameter of the flange. In this view, the first end 2 admits fuel into the first stem that flows smoothly through the second stem 6 and out of the second end 3 where the smoothly flowing fuel passes through a chamber 12, generally a hollow cylinder, that extends through both stems 5, 6 and through the collar 9. The chamber also has an interior surface 12a of the adaptor as shown. The interior surface of the chamber generally has a constant radius so that fuel flows through the adaptor with near laminar flow and little if any turbulence induced by the surface.

Figure 9:
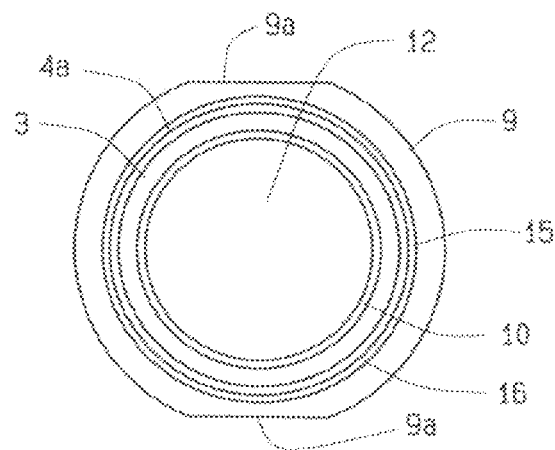
FIG. 9 shows an end view of the alternate embodiment of the adaptor.

This alternate embodiment of the adaptor has a generally symmetric form as shown in FIGS. 7, 8 and a generally round shape when viewed from the end 3 in FIG. 9. The collar 9 generally defines the maximum diameter, that is, the width of the adaptor as seen by the motorists after its installation. The collar, generally round, has two spaced apart and mutually parallel faces 9a that receive a tool, such as a wrench, for an installer to grip the adaptor for turning a hose or fitting onto the adaptor or for turning the adaptor into a hose or fitting. Stepped inwardly from the collar's diameter, the adaptor has its second stem 6 with its threads 4a here shown on end. Along the length of the second stem and inside of the threads, the flange 15 extends outwardly from the stem and has the O-ring 16 behind it. In the center foreground of the figure, the end 3 has its inward bevel 10. Inside of the end and inwardly from the bevel, the adaptor has the chamber 12 for fuel flow.

Figure 10:
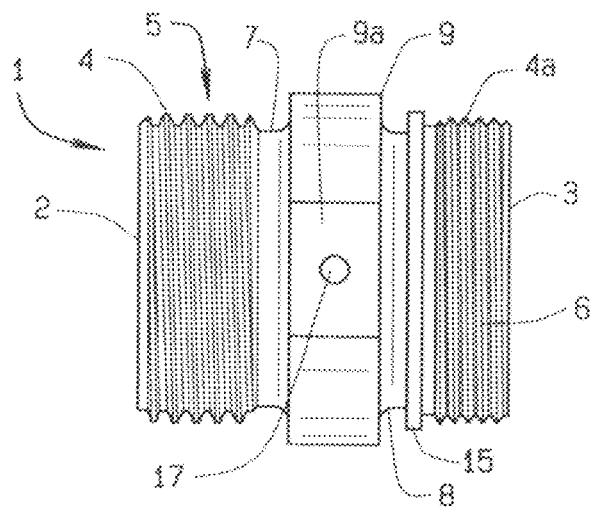
FIG. 10 describes another side view of the alternate embodiment of the adaptor of the present invention without an O-ring.

Similar to FIG. 7, FIG. 10 shows the second embodiment but without the O-ring. In the absence of the O-ring, the second stem 6 has a finer thread pattern 4a than the first stem 5 and its threads 4. As described above, the second notch 8 appears shallower than the first notch 7. The second notch has a slightly larger diameter than the first notch. The flange also separates the second notch from the threads of the second stem. The flange has a generally square edge condition that retains the O-ring when placed therein as previously shown. The collar as before has a generally round shape except for at least two faces. 17 is an M34 indicator.

Figure 11:
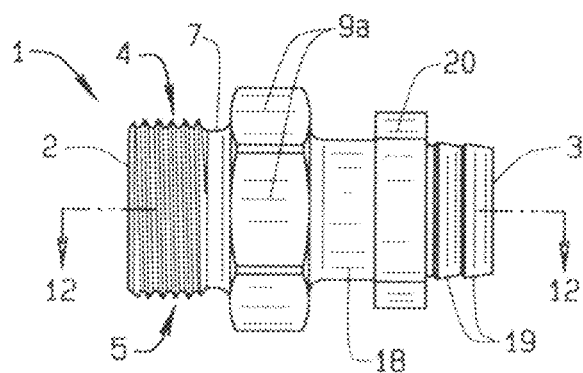
FIG. 11 shows a side view of a second alternate embodiment of the adaptor of the present invention.
Figure 13:
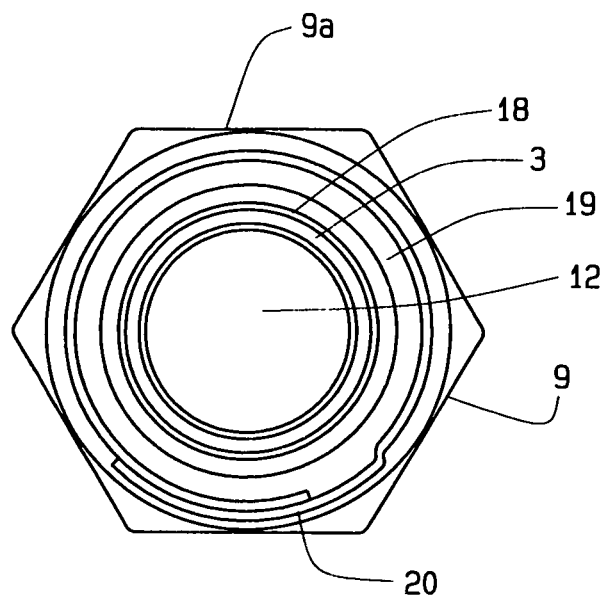
FIG. 13 shows an end view of the second alternate embodiment of the adaptor; and, FIG. 14 shows top and side views of a clip utilized with the second alternate embodiment of the invention.

A third embodiment of the adaptor appears in FIG. 11 in a side view. This adaptor 1 also has a generally hollow cylindrical form with a first end 2 and an opposite second end 3. As shown, the end 2 has external threads here shown as right hand, that continue for approximately five revolutions around the circumference of the end. The threads extend inwardly upon a first stem 5 but not an opposite second stem 18. The stems are hollow and have sufficient length for a solid connection of the adaptor to a hose or other fitting. The threads upon the first stem, as at 4, have generally coarse form. However, the second stem 18 has generally three concentric barbs 19 extending inwardly from the second end 3. The barbs have an angled shape parallel to the length of the adaptor, in this view, where the narrowest diameter of a barb locates towards the end 3 while the wider diameter locates towards the collar 9. Inwardly, the first stem 5 has the first notch 7 at the interior ending of the threads 4, proximate the collar 9. The second stem 18 has a generally lesser outer diameter than the first stem 5, generally less than the diameter of the threads 4. The second stem includes a clip 20, here shown as a band on edge. The clip has a width much less than the length of the second stem. The first notch 7 has a lesser diameter than the threads 4 and the end 2. Joining the two stems, more closely towards the first stem 5, than the second stem 18, this embodiment of the adaptor also has a collar 9 of a width noticeably greater than diameter of the threads 4 on the first stem, the outer diameter of the second stem 18, and the diameter of the clip 20. The collar has a thickness, along the length of the adaptor, suitable for gripping by a wrench or other tool. The collar extends around the circumference of the adaptor, perpendicular to the length of the adaptor. The collar of this embodiment has a plurality of faces 9a, here showing three faces of a hexagonal formation, as later shown in FIG. 13.

Figure 12:
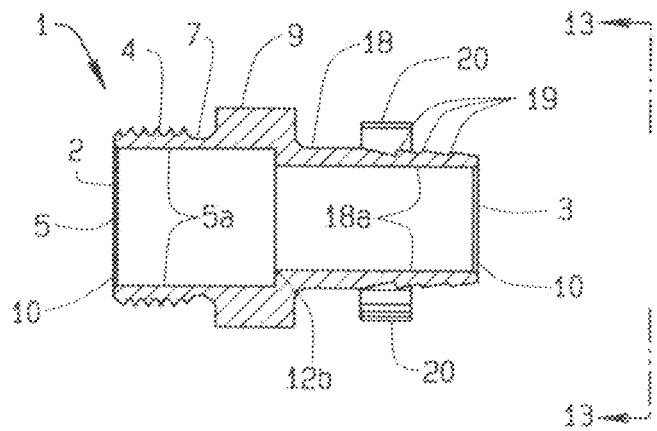
FIG. 12 shows a sectional view of the second alternate embodiment of the adaptor.

Unlike the prior two embodiments, within its interior this adaptor has an inward step that may interrupt the flow of fuel as shown in FIG. 12. This embodiment of the adaptor also has its collar 9, notch 7 outwardly of the collar, the opposed first stem 5 having threads 4 and the second stem 18 having barbs 19 as shown and described. The first stem has its generally hollow shape opening to the first end 2. The first end includes a slight inward bevel 10 that extends around the circumference of the first end. The second stem 18 also has a hollow shape but of a lesser inner diameter 18a than an inner diameter 11a through to its opening at the second end 3. The second end 3 also has an inward bevel as at 10. The second end opens into the second stem 18 that receives a hose (not shown) secured by the clip 20. In this view, the first end 2 admits fuel into the first stem 5 that flows through a first portion 5a of the chamber 12 at the inner diameter 5a and then steps inwardly, as at 12b, to a second portion 11b of lesser inner diameter as at 18a. The step extends around the inside circumference so that fluid flows from the first stem into the second stem with some flow effects that may induce turbulence. The chamber 12 is generally hollow with smooth surfaces inside the first stem and the second stem though of different inner diameters and through the collar 9 where the step in inner diameters remains within the collar as shown. The chamber also has an interior surface 12b of the adaptor as shown in both portions of the different inner diameters. The portion of the chamber in the first stem extends through the first stem 5 and well into the collar 9, preferably more than half of the thickness of the collar as shown. The portion of the chamber in the second stem extends through the second stem and slightly into the thickness of the collar.

This alternate embodiment of the adaptor has less symmetry than the previous embodiments. This adaptor has a round appearance with a hexagonal collar when viewed from the end 3 in FIG. 13. The collar 9 generally defines the maximum width of the adaptor as seen by the motorists after its installation. The collar has six faces 9a generally arranged as a hexagon so that the collar receives a tool readily, such as a wrench, for an installer to grip the adaptor for turning a hose or fitting onto the adaptor or for turning the adaptor into a hose or fitting. Stepped inwardly from the collar's width, the adaptor has its second stem 18 with its barbs 19 here shown on end. Outwardly from the barbs, the second stem has the clip 20 placed concentrically upon it. The clip is generally round with a diameter exceeding that of the second stem. In the center foreground of the figure, the end 3 has its inward bevel 10 and inwardly from the bevel, it has the chamber 12 for fuel flow.

Figure 14:
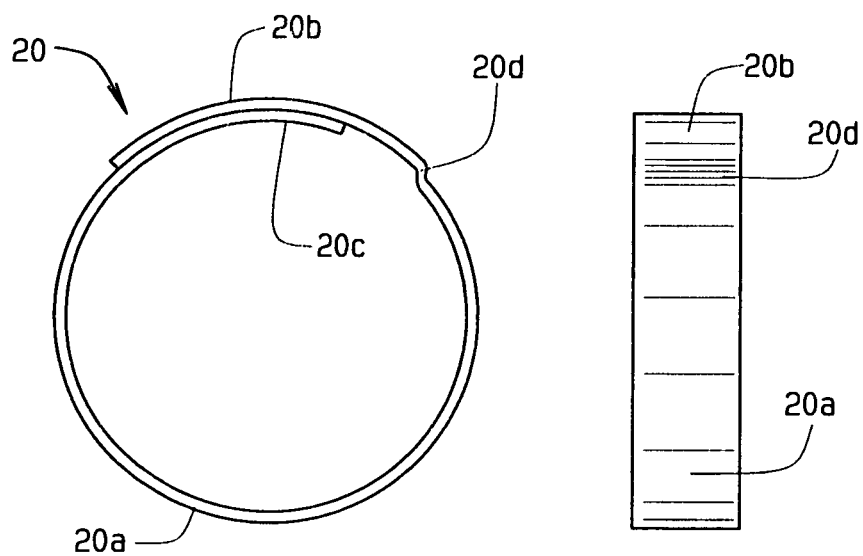

Viewing the clip itself, FIG. 14 shows the clip 20 from the front. The clip has a main body 20a having a generally circular shape though of material having a thin cross section. The main body has a first tip 20b overlapping a second tip 20c. The first tip and the second tip define the outermost ends of the clip material and are generally opposite prior to forming the material into a round shape. The first tip overlays the second tip so effectively the first tip has a slightly greater diameter than the second tip. The first tip extends from the main body at a relief 20d bent into the main body. The relief offsets the first tip slightly outwardly from the second tip but the relief, the main body, and the second tip has the same diameter. Turning the clip, FIG. 14 also has the clip in a side view. The clip has a generally cylindrical shape of a short length, thus the rectangular appearance in the right of FIG. 14. The clip has its main body 20a and the relief 20d bent from the main body leading into the first tip 20b. The relief extends across the width of the main body. Following insertion of a hose upon the barbs 19 and within the clip 20, an installer crimps the clip upon the hose, securing it to this third embodiment of the adaptor.

From the aforementioned description, a threaded adaptor has been described. This adaptor is uniquely capable of connecting two female openings simultaneously for hoses, fittings, and combinations thereof. This adaptor also has a collar locating proximate the center that allows rotation of the entire adaptor as needed during its installation. Though the adaptor and other components are shown and described with round cross-sections, other cross-sections are possible in alternate embodiments. This adaptor and its various components may be manufactured from many materials including but not limited to polymers, low density polyethylene, high density polyethylene, polypropylene, nylon, ferrous and non-ferrous metals, their alloys, and composites.

Variations or modifications to the subject matter of this invention may occur to those skilled in the art upon reviewing the development as described herein. Such variations, if within the scope of this development, are intended to be encompassed within the principles of this invention, as explained herein. The description of the preferred embodiment, in addition to the depiction within the drawings, is set forth for illustrative purposes only.

I claim:

1. An adaptor connecting a hose, a fitting, a nozzle or other attachment for use in fuel dispensing, comprising:
    said adaptor having a first stem and an opposite second stem, said first stem and said second stem having a generally hollow cylindrical shape provided therethrough;
    a collar position between said first stem and said second stem, said collar having at least two faces adapted to receive a tool;
    a chamber extending within a through said first stem, said collar, and said second stem, said chamber adapted to pass fuel therethrough;
    said first stem having threads thereon and a notch of lesser diameter than said threads between said threads and said collar;
    said second stem having threads thereon and a notch of lesser diameter than said threads between said second stem threads and said collar opposite the notch of said first stem;
    at least one gasket engaging one of said first and second stem threads;
    said gasket having an edge positioned upon the perimeter of said gasket, an outer rim provided upon the perimeter of said gasket and an inner rim provided opposite of said outer rim, said inner rim having at least three flutes circumferentially aligned and extending radially inwardly of said rim, said flutes adapted to engage said threads of the adaptor; said gasket provided for forming a seal between said adaptor when connecting with a hose, a fitting, or a fuel dispensing nozzle; and
    said edge of the gasket from said inner rim to said outer rim having one of a taper and slope.

2. The connection adaptor of claim 1 further comprising:
    said first stem and said second stem each having beveled ends outwardly from said collar generally leading into said chamber;
    said collar having two spaced apart and mutually parallel faces, said faces being generally parallel to the length of said adaptor, said collar being round away from said faces; and,
    said chamber having a smooth surface.

3. The connecting adaptor of claim 1 wherein the radius of each flute having a generally semi-circular shape extending inwardly into the gasket and towards its nominal center.

4. The connecting adaptor of claim 1 wherein said gasket has an odd number of flutes to prevent jamming of the gasket during its installation upon the adaptor threads.

5. The connecting adaptor of claim 1 and at least one o-ring fitting over said threads and locating within at least one of said notches when installed upon the adaptor.

6. The connecting adaptor of claim 1 wherein said gasket at its side having at least two barbs.

* * * * *